United States Patent
Kuchuk-Yatsenko et al.

(10) Patent No.: US 8,426,762 B2
(45) Date of Patent: Apr. 23, 2013

(54) METHOD OF RESISTANCE BUTT WELDING USING CORRUGATED FLUX-FILLED METAL INSERTS

(75) Inventors: Viktor S. Kuchuk-Yatsenko, Kyiv (UA); Andrei A. Nakonechnyi, Kyiv (UA); Andrei G. Sakhatskiy, Kyiv (UA)

(73) Assignee: E.O. Paton Electric Welding Institute of The National Academy of Sciences of Ukraine, Kyiv (UA)

( * ) Notice: Subject to any disclaimer, the term of this patent is extended or adjusted under 35 U.S.C. 154(b) by 1368 days.

(21) Appl. No.: 11/636,310

(22) Filed: Dec. 8, 2006

(65) Prior Publication Data

US 2008/0135529 A1 Jun. 12, 2008

(51) Int. Cl.
*B23K 11/02* (2006.01)
(52) U.S. Cl.
USPC .......................................................... 219/104
(58) Field of Classification Search ............... 219/85.14, 219/85.15, 101, 104, 118; 228/124.5, 246, 228/247, 250, 262.5
See application file for complete search history.

(56) References Cited

U.S. PATENT DOCUMENTS

| | | | | |
|---|---|---|---|---|
| 1,382,607 A | * | 6/1921 | Rathbone et al. | 428/593 |
| 1,835,899 A | * | 12/1931 | Rode | 219/145.31 |
| 1,907,051 A | * | 5/1933 | Emery | 219/145.1 |
| 2,067,206 A | * | 1/1937 | Ross | 313/355 |
| 3,219,791 A | * | 11/1965 | Galloway | 219/104 |
| 3,291,704 A | * | 12/1966 | Diedrich et al. | 202/236 |
| 3,496,326 A | * | 2/1970 | Brubaker et al. | 219/104 |
| 3,620,830 A | * | 11/1971 | Kramer | 219/145.23 |
| 6,244,497 B1 | * | 6/2001 | Conn et al. | 228/119 |
| 2005/0067383 A1 | * | 3/2005 | Ohashi et al. | 219/118 |

FOREIGN PATENT DOCUMENTS

| | | | | |
|---|---|---|---|---|
| EP | 588545 A1 | * | 3/1994 | |
| JP | 60152378 A | * | 8/1985 | |
| JP | 63278679 A | * | 11/1988 | |
| JP | 04253578 A | * | 9/1992 | |
| JP | 06007953 A | * | 1/1994 | |
| JP | 06277854 A | * | 10/1994 | |
| JP | 09038782 A | * | 2/1997 | |
| JP | 2004090093 A | * | 3/2004 | |

* cited by examiner

*Primary Examiner* — Stephen J Ralis
*Assistant Examiner* — Thien S Tran
(74) *Attorney, Agent, or Firm* — Cesari and McKenna, LLP

(57) ABSTRACT

A method of resistance butt welding in which a current-conducting insert is placed into a gap between the parts being welded, axial pressure force is applied and electrical current is passed. The current-conducting insert is a shaped metal insert having cavities filled with a welding flux and is placed in the gap between the parts being welded.

4 Claims, 1 Drawing Sheet

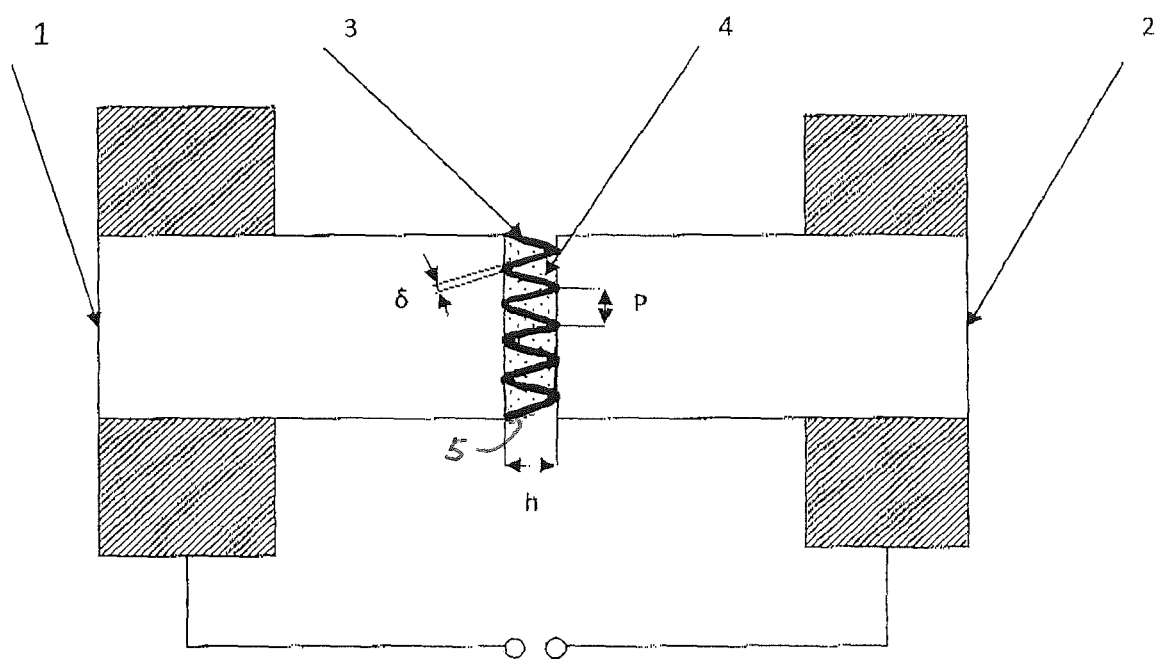

METHOD OF RESISTANCE BUTT WELDING USING CORRUGATED FLUX-FILLED METAL INSERTS

The claimed invention pertains to resistance overlap or butt welding, predominantly to welding of items of a large cross-section, and can be applied in various industries where resistance welding is used.

BACKGROUND OF THE INVENTION

Known is a method of resistance butt welding of items having large cross-sections (A.C. USSR 105251 B.I. No. 1, 1957, MPK V 23 K 11/2), where circumferential projections are made on parts being welded for concentration of the heat generated.

Known is a method of resistance butt and spot welding (Patent of Japan 45-22604), in which an insert in the form of a lens is placed between parts of different thickness to provide the possibility of their welding. This gave an opportunity to increase the contact resistance of the butt and to increase the heat localization.

The disadvantage of these methods is a short time of the contact resistance increase due to overheating and plastic deformation of an intermediate insert.

Known also is a method of resistance butt welding (A.C. USSR 1232422 B.I. No. 19 1986 MPK V 23 K 11/02), in which a machine lubricating oil is used as a protection of the welding zone and prevention of carbon burn-out in the butt.

Known too is a method of resistance welding using a flux (U.S. Pat. No. 1,437,764), in which the welding is performed under a flux layer, shielding the welding zone from the atmosphere and cleaning the surface of oxide films.

The main disadvantage of the above-mentioned methods is the fact that the edges of the parts are in a brought-together state before the pouring of a flux mixture or organic elements. Therefore the metal, during the welding process, is shielded only on the external surface of the joint, while gases and oxides, available at the edges of parts being welded, remain mainly in the butt. The external shielding has little influence on the quality of welding inside the butt due to the impossibility of flux and metallic powder to enter the butt of strongly clamped parts.

Also known is a method of resistance butt welding (A.C. USSR 1738539 B.I. No. 21 1992 MPK B 23 K 11/02), selected as a prototype, in which a current-conducting insert in the form of a powder of a self-fluxing current-conductive alloy or a mixture of a metallic powder with alloying and fluxing components is placed between the edges of parts before welding. The powder is maintained by a non-conducting bushing with a slot. During welding, the powder is forced out together with oxides and a molten layer through the bushing slot. This method guarantees the oxides removal inside the butt and increases the heat localization at the expense of a contact resistance of the metallic powder.

The disadvantages of this prototype are the non-uniformity of a thermal field in the joint cross-section due to a random nature of formation of contact spots in the metallic powder layer that leads to overheating and splashes of locally-overheated volumes of metal. Thus, the bushing application complicates the process of welding and does not allow the process to be automated.

SUMMARY OF THE INVENTION

The present invention is based on the problem of improving efficiency and quality of resistance butt welding by the creation of a slag shielding of the welding zone, metallurgical effect on weld metal and near-weld zone, guarantee of uniform thermal field and intensification of heating of parts being welded, decrease in allowance for preheating and upsetting that will give an opportunity for weld joints of a large cross-section.

The principle of the invention consists of the fact that in the proposed method of resistance welding, a current-conducting shaped metal insert, whose cavities are filled with a welding flux, is placed in a gap between the parts being welded. The insert preferably has the form of a shaped metal sheet with symmetrically and periodically arranged peaks, where the peak height and the pitch between them are set depending on the thickness $\delta$ of the sheet of the shaped insert, p between peaks relating to the sheet thickness $\delta$ as 3÷20 up to 1, height h relating to the sheet thickness $\delta$ as 5÷15 up to 1, and the shaped insert material being similar to, or different from, the material of parts being welded.

The composition of the welding flux includes fluxing and alloying elements, where the solidus temperature of alloy of the alloying components and base metal should be lower than the solidus temperature of the base metal and material of the shaped current-conducting insert, but should be higher than the melting temperature of the fluxing components. An activating sub-micron coating can be deposited on the surface of the shaped metal insert. The welding current is changed depending on displacement of parts during the welding process or input energy in heating. Upsetting of parts is performed depending on displacement of parts during the welding process or the input energy in heating.

BRIEF DESCRIPTION OF THE DRAWINGS

The single FIGURE is a schematic diagram of welding according to the invention.

DETAILED DESCRIPTION OF AN ILLUSTRATIVE EMBODIMENT

Referring to the drawing, the method is realized as follows. Between parts 1 and 2, being welded, a shaped metal insert 3, e.g. a corrugated sheet, whose channels or cavities are filled with a welding flux 4, is placed. The insert peaks 3a contact the parts being welded, thus providing a reliable and stable electrical contact over the entire area of welding. Owing to the springy and flexible shaped insert, a certain nonparallelism of edges of parts being welded is tolerated. If desired, an activating sub-micron coating 5 may be deposited on a surface of insert 3.

At the initial stage, the welding current is passed through the peaks of the shaped insert and heats the current-conducting insert due to the smaller cross-section and pinch-in effect. Cavities of the shaped insert are filled with a welding flux which exists under conditions of volumetric compression and does not allow the insert to be deformed until attaining the flux melting temperature in the zone of welding.

After flux melting, the welding current through the metal insert is shunted by the molten current-conducting flux, which starts cleaning the surfaces of the parts being welded of oxides and contaminations. Alloying elements of the flux start to come into reaction with metal of the parts being welded and metal of the insert, forming a liquid phase, wets the metal surfaces and forces out gradually the molten flux and remnants of fluxing from the butt along the channels of the shaped insert owing to the capillary effect. The flux also wets the external surfaces of the joint and near-weld zone, thus shielding them from the effects of the atmosphere.

When the flux and remnants of fluxes are forced out completely by the molten metal and the temperature of the parts being welded reaches the preset temperature, the upsetting is performed.

The value of upsetting is lower as compared with that of a traditional resistance welding owing to the flux shielding of the weld described above and concentrated heating.

The method of resistance welding which is offered here was tested under the laboratory conditions for welding aluminium AD1 in MS 606 type machine having a capacity of 100 kVA.

Specimens of 25 mm diameter were welded, open-circuit voltage $U_{xx}$=4.2 V, current density i=15 A/mm$^2$, total allowance L=3 mm, upset pressure P=10 MPa, welding speed at final stage V=0.2 cm/s, time of welding—4 s. Consumed power for one weld was 70 kJ. Mechanical tests showed that the specimens fractured in base metal beyond the heat-affected zone.

For comparison, the conditions of traditional resistance welding are as follows: open-circuit voltage $U_{xx}$=3.8 V, current density i=100 A/mm$^2$, upset pressure P=800 MPa, time of welding—2.5 s. Total allowance L=18 mm. Consumed power for one weld was 500 kJ.

The method of resistance welding, which is presented here, allows improving the quality and decreasing the power and load parameters of welding, decreasing significantly the mass-dimensional characteristics of the welding machine and making it possible to weld items having a large cross-section using the method of resistance welding.

The method which is offered is further characterized by novelty and important advantages that allow achieving the set task.

The invention claimed is:

1. In a method of resistance butt welding first and second parts where a current-conducting insert is placed between said parts, an axial force is applied to press together said parts and said insert between them and during a heating period, an electric current is passed through said parts and said insert which heats up said parts and said insert, causing melting of said insert and displacement of said parts to form a welded joint, the improvement wherein: selecting said insert to be a corrugated sheet of a metal and having a thickness and corrugations with symmetrically and periodically arranged peaks with spaces therebetween, said peaks having a height h and a pitch p, both of which are set depending on said thickness δ, said peak pitch p relating to the sheet thickness δ as 3÷20 up to 1 and said height h relating to the sheet thickness δ as 5÷15 up to 1, and filling said spaces with a welding flux composed of fluxing and alloying elements, said fluxing element having a melting temperature and said alloying elements being an alloy of alloying components and a base metal, said alloy having a solidus temperature that is lower than a solidus temperature of said base metal and said sheet metal, but higher than said melting temperature.

2. The method of claim 1 including the additional step of depositing an activating sub-micron coating on said insert.

3. The method of claim 1 and further including the step of changing said electric current depending on said displacement.

4. The method of claim 1 and further including the step of performing an upsetting depending on said displacement.

* * * * *

UNITED STATES PATENT AND TRADEMARK OFFICE
CERTIFICATE OF CORRECTION

PATENT NO.        : 8,426,762 B2                           Page 1 of 1
APPLICATION NO.   : 11/636310
DATED             : April 23, 2013
INVENTOR(S)       : Viktor S. Kuchuk-Yatsenko It is certified that error appears in the above-identified patent and that said Letters Patent is hereby corrected as shown below:

In the Claims:

In col. 4, line 10 should read:
corrugated sheet of a metal and having a thickness $\underline{\delta}$ and cor- Signed and Sealed this
Twenty-fifth Day of June, 2013

Teresa Stanek Rea
*Acting Director of the United States Patent and Trademark Office*